United States Patent
Ahlbrecht et al.

(10) Patent No.: US 6,826,476 B2
(45) Date of Patent: Nov. 30, 2004

(54) APPARATUS FOR IMPROVED INTEGRITY OF WIDE AREA DIFFERENTIAL SATELLITE NAVIGATION SYSTEMS

(75) Inventors: Mark A. Ahlbrecht, Champlin, MN (US); Randolph G. Hartman, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/286,118

(22) Filed: Nov. 1, 2002

(65) Prior Publication Data

US 2004/0088111 A1 May 6, 2004

(51) Int. Cl.$^7$ .............................................. G01C 21/26
(52) U.S. Cl. ........................ 701/213; 701/214; 701/215; 342/357.02; 342/357.06
(58) Field of Search ................................ 701/213, 214, 701/215, 300, 301; 342/357.02, 357.13, 357.12, 357.03, 357.06

(56) References Cited

U.S. PATENT DOCUMENTS

| | | | |
|---|---|---|---|
| 6,049,304 A | | 4/2000 | Rudel et al. |
| 6,067,484 A | * | 5/2000 | Rowson et al. ............. 701/213 |
| 6,216,065 B1 | * | 4/2001 | Hall et al. ................... 701/301 |
| 6,469,663 B1 | | 10/2002 | Whitehead et al. |
| 6,552,680 B1 | * | 4/2003 | Barber et al. ........... 342/357.02 |

OTHER PUBLICATIONS

FAA Specification FAA–E–2937A, Apr. 17, 2002.
RTCADO–246A Specification, Nov. 28, 2001.
XP–001025014—EGNOS: The First Step in Europe's Contribution to the Global Navigation Satellite System, L. Gauthier, P. Michel & J. Ventura–Traveset, Jan. 2, 2001, pp. 35–42.

* cited by examiner

*Primary Examiner*—Richard M. Camby
(74) *Attorney, Agent, or Firm*—Schiff Hardin LLP

(57) ABSTRACT

An arrangement and appertaining method utilizing the arrangement provides a cost effective way to implement an accurate and cost effective satellite positioning differential augmentation system. This hybrid system integrates a network of Ground Based Augmentation Systems (GBAS) with a Satellite Based Augmentation System (SBAS), permitting the high integrity features of the GBAS to be utilized with the much broader coverage area of the SBAS system without requiring significant expenditures that would be required for upgrading either of the systems independently.

16 Claims, 7 Drawing Sheets

APPARATUS FOR IMPROVED INTEGRITY OF WIDE AREA DIFFERENTIAL SATELLITE NAVIGATION SYSTEMS

BACKGROUND OF THE INVENTION

1. Field of the Invention

The present invention relates generally to satellite based positioning systems such as GPS and more specifically to the measurement and monitoring of the signals transmitted by differential satellite augmentation systems.

2. Description of Related Art

A satellite based positioning system is used to determine a position of a receiver and typically includes a plurality of satellites, the receiver, and one or more ground stations. Each of the satellites transmits a signal that contains a code and certain prescribed information useful to the receiver in determining its position.

The receiver synchronizes itself to the codes of at least four satellites and uses the information in the signals from these satellites in order to perform a triangulation-like procedure so as to determine its coordinates with respect to a reference, such as the center of the Earth and the GPS standard time. The receiver is not constrained to a specific location and, therefore, represents a variable position. The purpose of the satellite based positioning system is to make it possible for the receiver to determine its position regardless of the location of the receiver.

The accuracy of the position determined by the receiver is adversely affected by conditions that are common to all receivers in a given area. A ground station containing a receiver in a fixed location is used to monitor the signals transmitted by the satellites and determines corrections to the transmitted satellite signal. The ground station notifies the receiver of any necessary signal corrections to allow the receiver to make more accurate position calculations. This arrangement is referred to as differential positioning.

Since the mobile receiver completely relies on the corrections transmitted from the ground station as being correct, any condition that is inconsistent between the satellite measurements made at the mobile receiver and the ground station will cause a an undetected error in the mobile receiver. To protect the mobile receiver, the ground station monitors the signals transmitted by the satellites in order to detect faults within the satellites that would affect the mobile receiver. This function of detecting faults is referred to as providing integrity for the corrections that the ground station sends to the mobile receiver. For GPS, these faults include signal power, code signal deformation, code and carrier divergence, radio frequency interference, signal acceleration and erroneous ephemeris data.

The ground station system is also referred to as an augmentation system, since it augments both the accuracy and integrity of the original navigation satellite signals. There are two classes of augmentation systems: (1) Satellite Based Augmentation System (SBAS) that provides differential positioning across a wide area like the continental US, and (2) Ground Based Augmentation System (GBAS) that provides differential positioning to a smaller area, up to about 200 miles.

Satellite-Based Augmentation System (SBAS)

The known SBAS architecture used for wide-area coverage is shown in FIGS. 1 and 2. In the SBAS architecture 10, a network of receivers 14 is used to collect satellite data 120, and perform measurements 110, from the navigational satellites 20 over a satellite to receiver communication path 214 and determine augmentation data 132, which includes differential corrections, ionospheric delay errors, and accuracy of the navigation satellite signals at the receivers' 14 location.

This measurement data 110 is transferred from the receiver 14 to one or more master stations 12 via a receiver to master station communication path 232. The master stations 12 are centralized data processing sites used to determine differential corrections and integrity of the augmentation 110 over the SBAS Area of Coverage 16. The processed SBAS correction and integrity data 132 is then sent to an SBAS satellite 18 via a master station to satellite communication path 212. This SBAS satellite 18, that generally functions as a communications repeater, then broadcasts the correction and integrity data 132 via a satellite to SBAS user communication path 218 to any user 23 within the area of coverage 16. This structure is illustrated in more detail in FIG. 2.

Ground-Based Augmentation System (GBAS)

According to FIG. 3, the Ground Based Augmentation System (GBAS) 30 contains GBAS receivers 32 that measure navigation satellite data 120 provided by the satellite 20 via a satellite to GBAS receiver communication path 240. These receivers 32 communicate satellite data and ranging measurements 150 to a GBAS processor 34 that determines the differential corrections and integrity of the satellite signals. The processor 34 communicates these corrections and integrity data 152 through a local area transmitter 36 to a GBAS user receiver 38 within the GBAS coverage area. Typically the area of coverage for a GBAS is 30 to 50 miles. This smaller coverage volume allows the GBAS to provide greater levels of accuracy and integrity than the SBAS.

The greater levels of accuracy and integrity lend the GBAS to precision airplane approach applications. Due to the strict integrity requirements of precision approach applications, current GBASs, such as those defined by the FAA in FAA Specification FAA-E-2937A ("FAA-E-2937A"), herein incorporated by reference, contain monitors for detecting the integrity of the satellite signal waveform as well as the integrity of the ranging measurement from the satellites. Use of these monitors and other requirements allow the accuracy, continuity and integrity of GBAS to be much greater than that of SBAS.

Known Solutions

Allowing for more complex operations like precision approach in the SBAS coverage volume requires a greater level of integrity and monitoring than is provided by current SBAS implementations. Two known solutions for addressing enhanced integrity on SBAS have been previously considered.

The first solution applies additional SBAS reference receivers 14 to provide additional sampling points within the coverage area 16. The measurements from these additional receivers 14 develop a more detailed differential and ionospheric correction. Unfortunately, additional receivers 14 add cost for the receivers 14 and communication links 232, 234.

The second solution includes, in the SBAS receivers 14, satellite signal monitors similar to that required per FAA-E-2937A. These monitors would increase the integrity of the measurements made by the receivers by monitoring for the types of anomalies defined in FAA-E-2937A. However, this solution also requires additional costs to update the numerous current receivers 14 that exist with these new monitors.

SUMMARY OF THE INVENTION

The present invention utilizes the resources of the GBAS station to supplement the measurement and integrity requirements of the of the SBAS station receivers. This is accomplished by an inventive rigorous communication link between the GBAS stations and the SBAS master station and the necessary processing, translation and storage of related information. The present invention also improves the functionality of the GBAS stations by exchanging data between the various GBAS stations on the communication link.

In its most rudimentary form, the GBAS passes raw measurements, corrections, integrity measurements, and integrity monitoring results to the SBAS station via this rigorous link. The SBAS station can utilize this data to produce corrections and monitoring consistent with the same level of rigor as the GBAS system and thereby increasing the SBAS stations integrity. This communication function and master station function mitigate the hazardous and misleading effects that can be caused on the SBAS user by the SBAS receiver. Thus the SBAS receiver can be can be developed to a lower level of certification or potentially completely removed.

Individual GBAS stations can use the data collected from other GBAS stations on the communication link to improve the functionality and integrity of the corrections produced over those produced by the GBAS system alone. The functionality is increased since the GBAS network can produce wide area corrections similar to the known SBAS implementation and could as such replace the SBAS receivers with a GBAS system that would also provide local area service. The integrity of the GBAS system can improved with the GBAS network data by using measurements from other GBAS systems to monitor effects of satellite signals that vary only over long distances such as ionospheric effects. These effects are challenging for GBAS to monitor since the effect is difficult to isolate with measurements made over the short distances between the GBAS receivers. Using measurements from other GBAS stations a greater distance away makes these determinations simpler to perform with greater integrity.

Specifically, the invention relates to a ground based augmentation system (GBAS) network, comprising: a navigation satellite; an interconnecting system communication network; at least a first GBAS and a second GBAS, each GBAS comprising: a GBAS receiver that is configured to receive navigation satellite data from the navigation satellite and covert it into GBAS raw augmentation data; a GBAS processor that is configured to receive GBAS raw augmentation data from the GBAS receiver and to format it into formatted GBAS differential correction and integrity data; and a GBAS transmitter configured to send GBAS differential correction and integrity data to the interconnecting system communication network; the GBAS processor of the first GBAS being configured to receive GBAS differential correction and integrity data produced by the second GBAS and to include this data in its own formatted GBAS differential correction and integrity data.

The invention also relates to an integrated satellite based augmentation system (SBAS)-GBAS comprising: a navigation satellite; an interconnecting system communication network; one or more GBASs, each GBAS comprising: a GBAS receiver that is configured to receive navigation satellite data from the navigation satellite and covert it into GBAS raw augmentation data; a GBAS processor that is configured to receive GBAS raw augmentation data from the receiver and to format it into formatted GBAS differential correction and integrity data; and a GBAS transmitter configured to send GBAS differential correction and integrity data to the interconnecting system communication network; the integrated SBAS-GBAS system further comprising: an SBAS, comprising: an SBAS satellite that is configured to transmit SBAS correction and integrity data to a user; an SBAS receiver that is configured to receive navigation satellite data from the navigation satellite and convert it into SBAS augmentation data; an SBAS master station that is configured to receive the SBAS augmentation data from the receiver, to receive GBAS differential correction and integrity data from the interconnecting system communication network, and to transmit processed SBAS correction and integrity data that includes the received GBAS differential correction and integrity data to the SBAS satellite.

The invention also relates to an integrated SBAS-GBAS system comprising: a navigation satellite; an interconnecting system communication network; one or more GBASs, each GBAS comprising: a receiver that is configured to receive navigation satellite data from the navigation satellite over a navigation satellite to GBAS receiver communication path and convert the navigation satellite data into GBAS raw augmentation data; a processor that is configured to receive GBAS raw augmentation data over a receiver to processor communication path, the processor comprising: a network input connected to a GBAS to interconnecting system communication network communication path that is configured to receive formatted integrated system data from the communication network; a receiver input connected to a GBAS receiver to GBAS processor communications path that is configured to receive the raw augmentation data from the receiver; an augmentation data database; a Local Area Augmentation System (LAAS) message receiver that is configured to receive the formatted integrated system data from the network input, convert the integrated system data, and store it in the augmentation data database; a GBAS receiver augmentation data receiver that is configured to receive the raw augmentation data from the receiver input, convert the raw augmentation data, and store it in the augmentation data database; an integrity monitor checker that is configured to read data from the augmentation data database; a receiver status database that is configured to store receiver status data; an LAAS message formatter that is configured to accept information from at least one of the augmentation data database, the integrity monitor checker and the GBAS receiver status database, and is configured to create at least one of LAAS messages for output; a network output that is configured to accept LAAS messages from the LAAS message formatter and output them to the GBAS to interconnecting system communication network communication path; a transmitter/user output that is configured to accept LAAS messages from the LAAS message formatter and output them to at least one of a local transmitter and user; the integrated SBAS-GBAS system further comprising: an SBAS, comprising: an SBAS satellite that transmits SBAS correction and integrity data to a user over an SBAS satellite to SBAS user communication path; a receiver that is configured to receive navigation satellite data from the navigation satellite over a navigation satellite to SBAS receiver communication path and convert the navigation satellite data into SBAS augmentation data; a master station that is configured to receive the SBAS augmentation data from the receiver over an SBAS receiver to SBAS master station communication path, the master station further comprising: a network input connected to an SBAS to interconnecting system communication network communication path that is configured to receive formatted integrated system data from the communication network; a receiver input connected to an SBAS receiver to SBAS master station communications path that is configured to receive SBAS augmentation data from the receiver; an augmentation data database; an SBAS LAAS message receiver that is configured to receive the formatted integrated system data from the network input, convert the integrated system data, and store it in the augmentation data database; an SBAS receiver augmentation data receiver that is configured to receive the SBAS augmentation data from the receiver input, convert the SBAS augmentation data, and store it in the augmentation data database; an SBAS integrity processor that is configured to receive the SBAS augmentation data that is stored in the augmentation data database and configured to process integrity data; a correction processor that is configured to receive augmentation data from the augmentation database and the integrity data and produce SBAS correction and integrity data; an output that is configured to accept the SBAS correction and integrity data from the correction processor and output them to the SBAS satellite via the SBAS master station to SBAS satellite communication path.

The invention also relates to a method for operating a networked GBAS system, comprising: receiving navigation satellite data by a first GBAS; formatting navigation satellite data by the first GBAS into formatted GBAS differential correction and integrity data; transmitting the formatted GBAS differential correction and integrity data to an interconnecting system communication network; receiving the formatted GBAS differential correction and integrity data from the interconnecting system communication network by a second GBAS; formatting navigation satellite data by the second GBAS into further formatted GBAS differential correction and integrity data, utilizing the received formatted GBAS differential correction and integrity data from the first GBAS; transmitting the further formatted GBAS differential correction and integrity data to at least one of the interconnecting system communication network and a GBAS user.

The invention also relates to a method for transmitting SBAS correction and integrity data to an SBAS satellite, comprising: producing, by a GBAS processor, formatted integrated system data comprising GBAS raw augmentation data; receiving, by an SBAS master station, SBAS augmentation data from an SBAS receiver and the formatted integrated system correction and integrity data from a communication network; formatting, by the SBAS master station, SBAS correction and integrity data using the SBAS augmentation data and the GBAS differential correction and integrity data; and transmitting the SBAS correction and integrity data to an SBAS satellite by the SBAS master station.

Finally, the invention also relates to a method for operating an integrated SBAS-GBAS system that comprises a GBAS and an SBAS, the method comprising: receiving navigation satellite data by a GBAS receiver and an SBAS receiver; formatting GBAS raw augmentation data from the navigation satellite data by the GBAS receiver; transmitting, by the GBAS receiver, GBAS raw augmentation data to a GBAS processor; formatting GBAS raw augmentation data into formatted GBAS differential correction and integrity data by the GBAS processor; transmitting the formatted GBAS differential correction and integrity data to an interconnecting system communication network; formatting SBAS augmentation data from the navigation satellite data by the SBAS receiver; transmitting, by the SBAS receiver, SBAS augmentation data to an SBAS master station; receiving, by the SBAS master station, formatted GBAS differential correction and integrity data from the interconnecting system communication network; formatting, by the SBAS master station, SBAS correction and integrity data using the SBAS augmentation data and the GBAS differential correction and integrity data; and transmitting the SBAS correction and integrity data to an SBAS satellite by the SBAS master station.

DESCRIPTION OF THE DRAWINGS

The invention is explained in greater detail below with reference to the drawings.

DETAILED DESCRIPTION OF THE INVENTION

Figure 1:
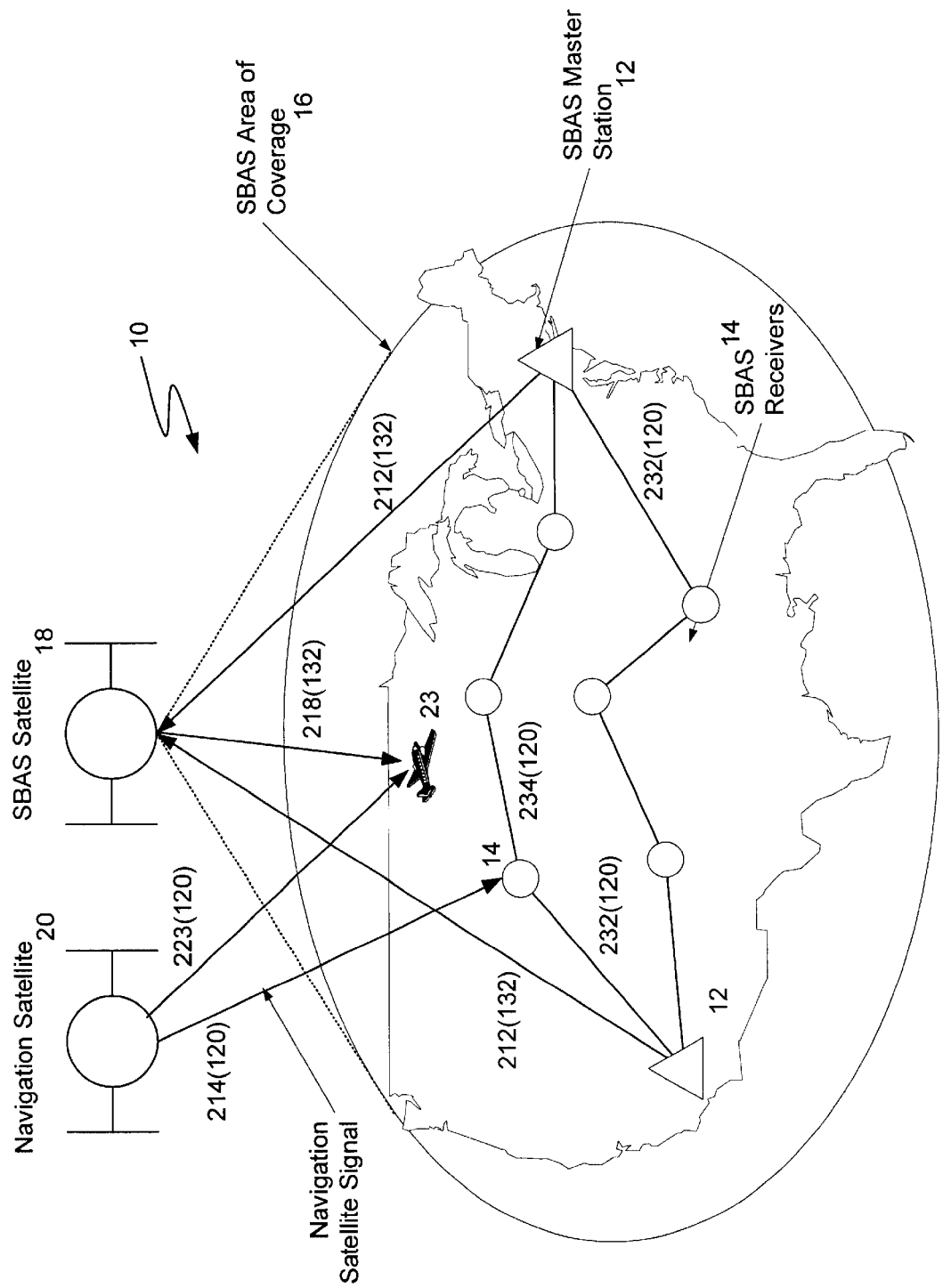
FIG. 1 is a pictorial diagram illustrating the known SBAS architecture.
Figure 2:
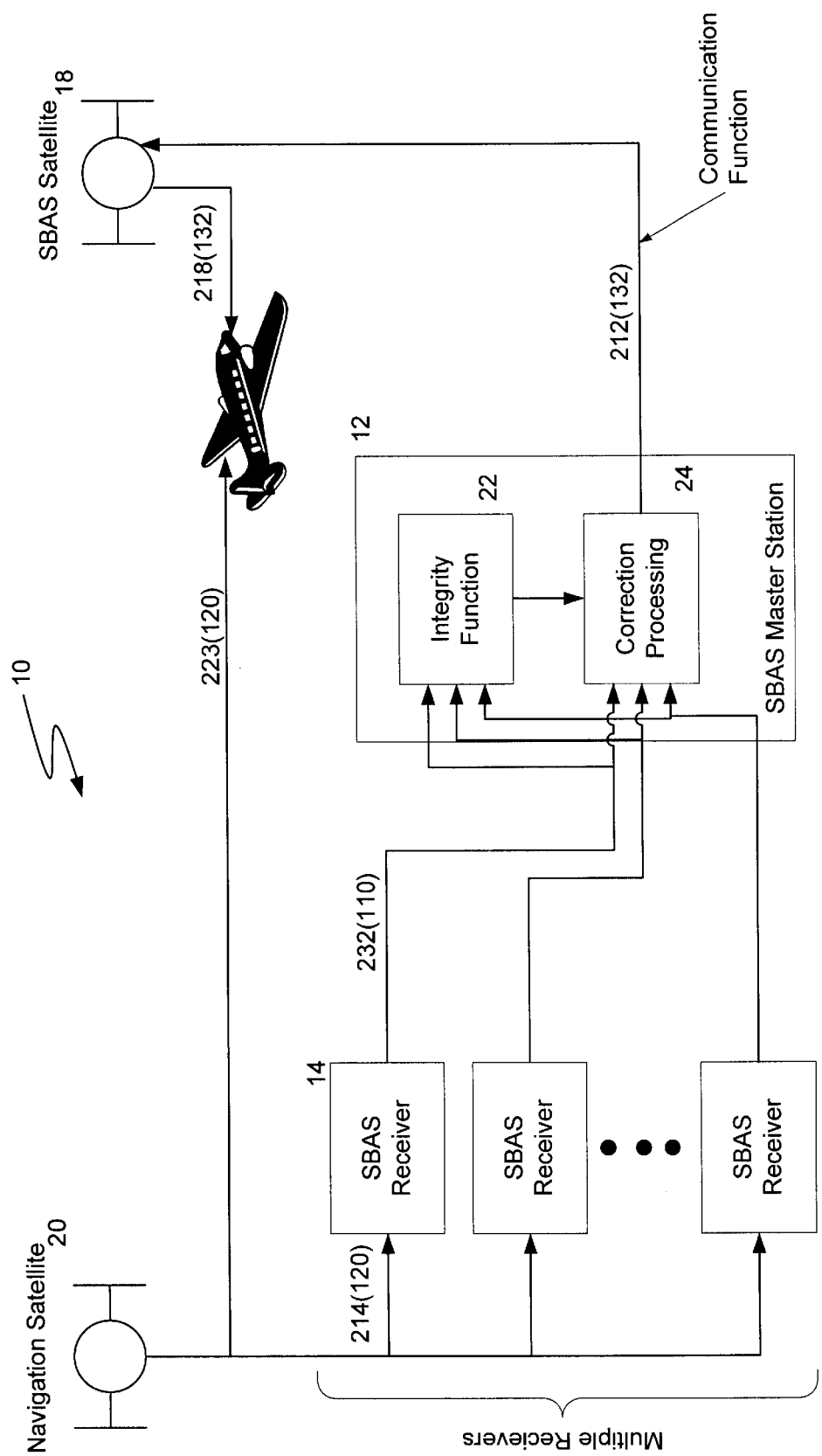
FIG. 2 is a dataflow schematic illustrating the known SBAS system.
Figure 3:
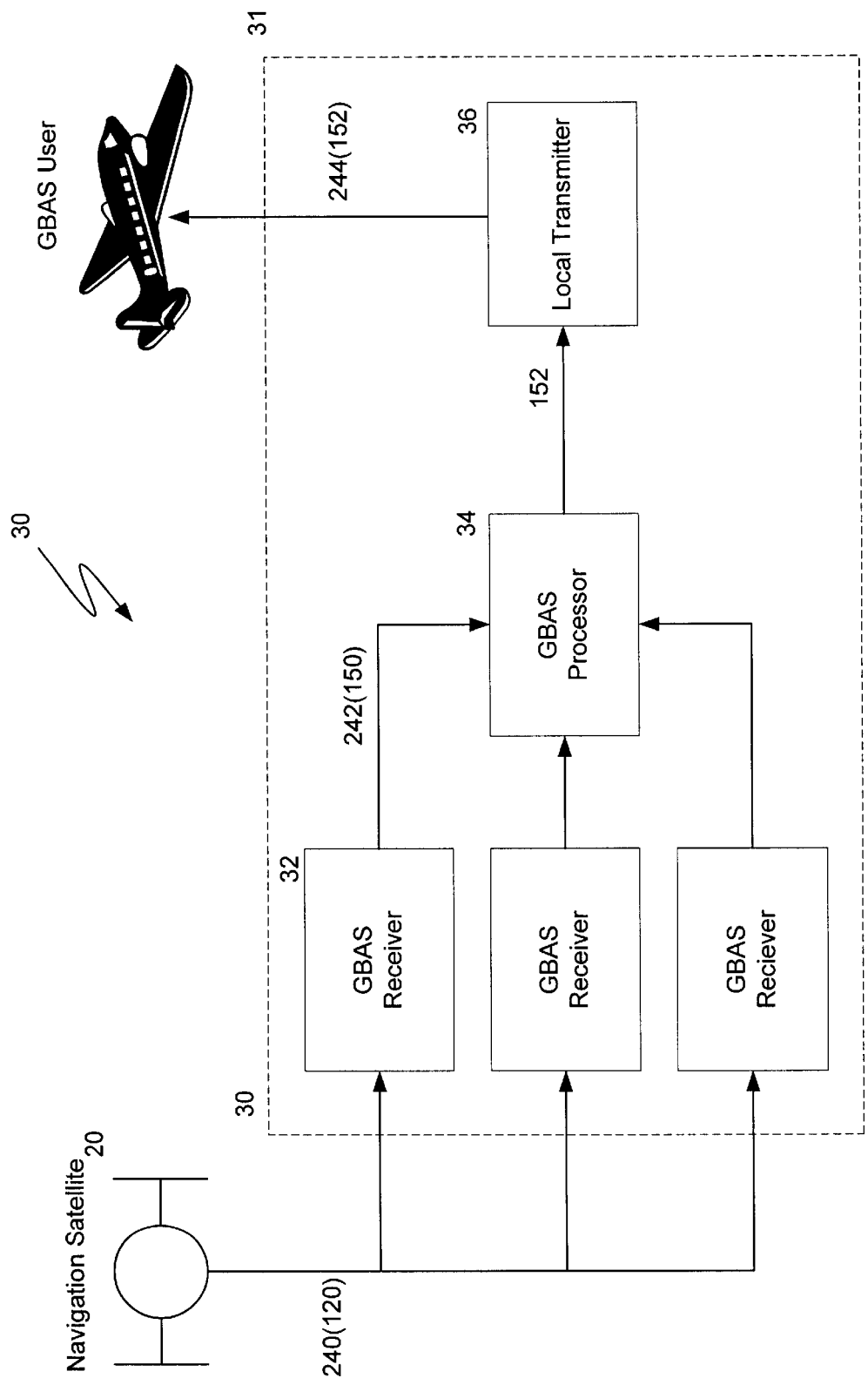
FIG. 3 is a dataflow schematic illustrating the known GBAS system.
Figure 4:
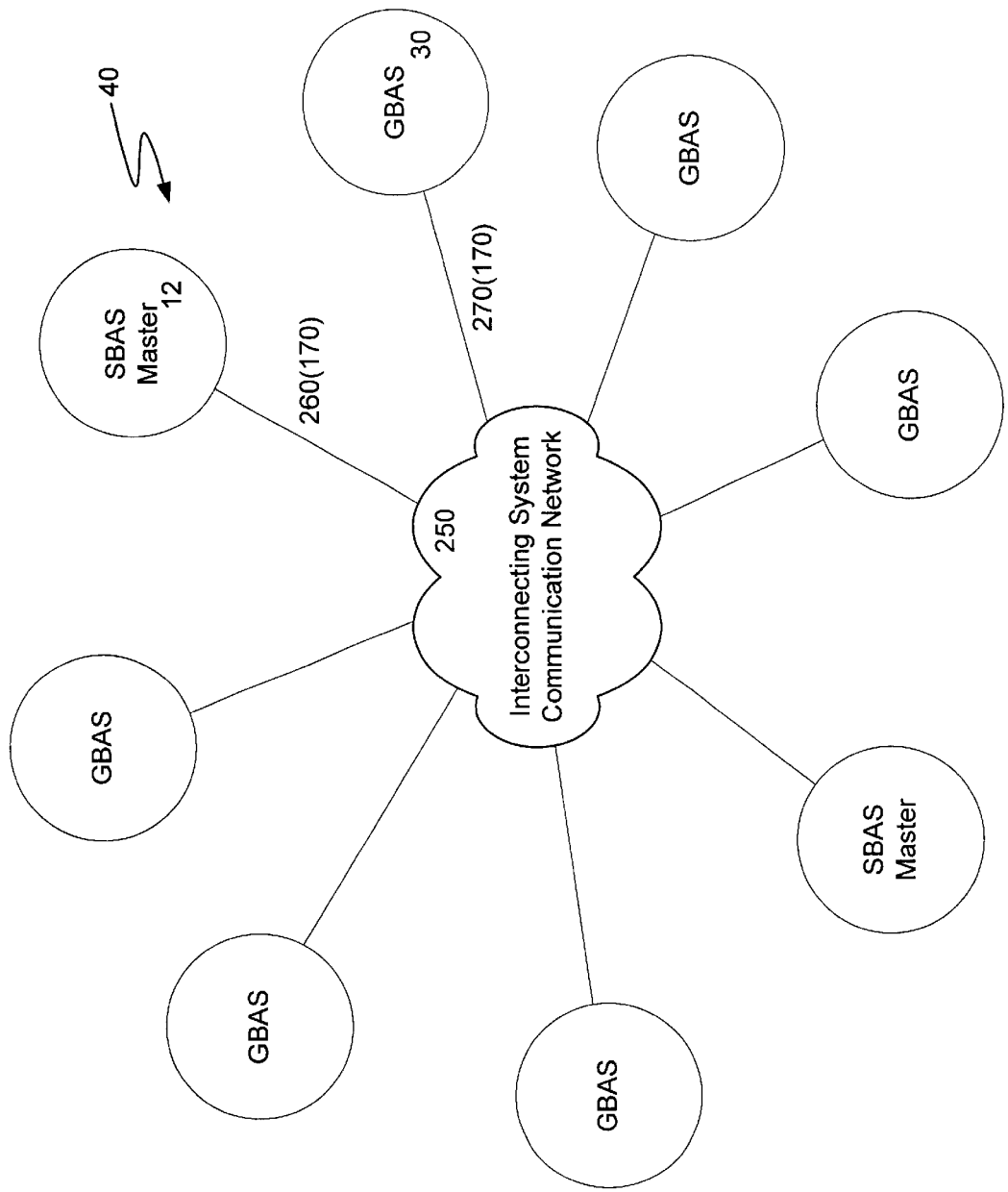
FIG. 4 is an interconnect diagram illustrating the inventive hybrid system.

FIG. 4 illustrates the basic architecture of the overall inventive integrated GBAS/SBAS 40 architecture in which the SBASs 10 and GBASs 30 are integrated. This integration is structured around a communication network 250 and protocol that transfers satellite measurement, correction and integrity data 120 determined at the GBAS stations 30 to other systems 12, 30 in order to gather and disseminate formatted integrated system data 170 that contains accurate and reliable correction and integrity data for users over a wide area (as in the SBAS system). This provides the benefit of having more accurate and reliable data obtained in the traditional GBAS architecture with the widespread coverage obtained in the traditional SBAS architecture.

As illustrated in FIG. 4, there are many GBASs 30 across a given region providing satellite corrections and integrity to users within their GBAS local coverage area. Each GBAS 30 is connected via a communications network 250 to other GBASs 30 as well as SBAS master stations 12. The GBAS stations 30 formulate messages 170 containing:

1. the raw measurements made by the GBAS station for each ranging source on each receiver contained in the GBAS system;
2. differential correction data for each ranging source available to the GBAS system;
3. raw measurements of signal integrity parameters for each satellite on each reference receiver; and
4. the results of integrity monitors performed by the GBAS on ranging sources, receivers and the GBAS system itself.

The GBAS 30 station obtains additional functionality once this information 170 is received from other GBASs 30. The additional data 170 is used to compute corrections and monitor integrity over a wide area, similar to SBAS. The GBAS 30 can also use the additional data to perform monitoring functions for the local area function that require a long separation between receivers 32. An example of this is the determination of the effect due to erroneous ephemeris data being transmitted from the satellite. The additional data received also supports the native integrity monitoring functions by providing additional data to isolate the root cause of any integrity failure between the a ranging source and a receiver.

The SBAS master station 12 can utilize the additional data 170 in a manner similar to the GBASs 30. The SBAS station 12 generates its correction and integrity data for its users from the data 170 received via the network 250. The raw measurements and correction data are used to determine the effect of observables that are required for the SBAS wide area system 10 to provide valid data to its users. Examples of these observables are ionospheric effects and Radio Frequency Interference (RFI). The SBAS master station 12 can also use the raw integrity measurement or integrity monitor results to determine if a given ranging source has lost integrity.

Communication Network and Protocols

The network 250 used for transfer of data may include any standard multiple access or point to point communication network used as standard industry practice. RS-232, IEEE 802.3, and EIA X.25, can be used as physical communication mechanisms in the current embodiment. TCP/IP and PPP may be used as transport mechanisms; with these transport mechanisms, socket technology may be employed over the TCP/IP and PPP transport protocols. The specifications defining these protocols are herein incorporated by reference.

The message protocol used to send data 170 across the communication network 250 in the current embodiment may be based on the LAAS (Local Area Augmentation System) signal in space application data protocol defined in the RTCA DO-246A Specification ("DO-246A"), herein incorporated by reference, Sections 2.3.5, 2.3.6 and 2.3.7 and illustrated in Table 1. Any suitable protocol known in the art may be used at each of the communication layers, however, and the invention is not limited to the utilization of those expressly listed.

TABLE 1

Format of a LAAS Message Block

| Message Block | Bits | Bytes |
|---|---|---|
| Message Block Header | 48 | 6 |
| Message | up to 1696 | up to 212 |
| Message Block CRC | 32 | 4 |

The Message Block Header is defined in DO-246A Section 2.3.6. This header contains message structure, Station ID, message type and length fields.
The Message is specific to the type of message.
The Message Block CRC is defined in DO-246A Section 2.3.7. The CRC provides message integrity against communication disruptions.

In the preferred embodiment that uses the LAAS protocol, at least six specific message types are sent across this network link 250. These messages 170 are transmitted from each GBAS station on the network and the messages are received on each of the GBAS stations 30 and the master SBAS station 10.

Three of these message types (1, 2 and 4) are defined in DO-246A, and three of these message types (48–50) are inventively provided. Although the messages are defined by the structures illustrated below, it should be understood that these definitions are only exemplary in nature and that the invention should not be limited to these precise structures but rather could include structures that contain similar data that could be operated upon in a similar manner. These messages include:

1. the known LAAS Type 1 message defined in DO-246A Section 2.4.3; the LAAS Type 1 message is used to communicate the differential corrections transmitted by each ranging source and integrity parameters on those corrections;

2. the known LAAS Type 2 message defined in DO-246A Section 2.4.4; the LAAS Type 2 message contains information on GBAS related data such as the GBAS position and accuracy designator among other parameters;

3. the known LAAS Type 4 message defined in DO-246A Section 2.4.6; the LAAS Type 4 message contains information on the identification and usable state of approaches to the GBAS;

4. a newly defined LAAS Type 48 message for a Raw Measurement Message illustrated in Table 2;

5. a newly defined LAAS Type 49 message for a Receiver Status Message illustrated in Table 3; and 6. a newly defined LAAS Type 50 message for an Integrity Monitor Message illustrated in Table 4.

The newly defined Raw Measurement Message may utilize the LAAS Message Type 48 (which is currently undefined in DO-246A) to communicate the raw measurement parameters for each ranging source and each receiver on the GBAS system. These parameters may include, as illustrated in Table 2, pseudorange and carrier measurements, satellite position data, signal to noise levels, and other relevant data. This message type may also include raw integrity measurements such as signal quality measurements that are made along the correlator function and carrier lock discriminators.

TABLE 2

Structure of the Receiver Status Message Application Data (Type 49)

| Parameter | Units or Fixed Value | Range | Resolution | Number of Bytes | Byte Number |
|---|---|---|---|---|---|
| Synchronization Character 1 | 2A hex | N/A | N/A | 1 | 1 |
| Synchronization Character 2 | 2A hex | N/A | N/A | 1 | 2 |
| Number of Bytes (fixed length; includes bytes 4 through 102) | 99 decimal | N/A | N/A | 1 | 3 |
| Reference Receiver | none | N/A | N/A | 1 | 4 |
| Ranging Source | ref. LGR-28516 and children | 0 to 255 | 1 | 1 | 5 |
| Status | ref. LGR-28523 and children | N/A | N/A | 3 | 6–8 (LSB . . . MSB) |
| Narrow Band Received Power | dB | 0 to 128 see note #3 | $1 + 2^9$ | 2 | 9–10 |
| Wide Band Received Power | dB | 0 to 128 see note #3 | $1 + 2^9$ | 2 | 11–12 |

TABLE 2-continued

Structure of the Receiver Status
Message Application Data (Type 49)

| Parameter | Units or Fixed Value | Range | Resolution | Number of Bytes | Byte Number |
|---|---|---|---|---|---|
| Pseudorange | meters | ±268,435,456 see note #3 | $1 + 2^7$ | 5 | 13–17 (LSB ... MSB) {4 lsb zero padded} |
| Accumulated Delta Range (Integer part) | meters | $±2^{31}$ see note #3 | 1 | 4 | 18–21 (LSB ... MSB) |
| Accumulated Delta Range (Fractional part) | meters | 0 to 1 See note #3 | $1 + 2^9$ | 3 | 22–24 (LSB ... MSB) {4 lsb zero padded, sign bit always 0} |
| Current IODE | none | 0 to 255 | 1 | 1 | 25 |
| Current Ephemeris CRC | calculated | N/A | N/A | 2 | 26–27 (LSB ... MSB) |
| Satellite X Position (current IODE) | meters | ±67,108,864 see note #3 | $1 + 2^8$ | 5 | 28–32 (LSB ... MSB) {5 lsb zero padded} |
| Satellite Y Position (current IODE) | meters | ±67,108,864 see note #3 | $1 + 2^8$ | 5 | 33–37 (LSB ... MSB) {5 lsb zero padded} |
| Satellite Z Position (current IODE) | meters | ±67,108,864 see note #3 | $1 + 2^8$ | 5 | 38–42 (LSB ... MSB) {5 lsb zero padded} |
| Satellite Correction (current IODE) | meters | ±2,097,152 see note #3 | $1 + 2^{10}$ | 4 | 43–46 (LSB ... MSB) |
| Previous #1 IODE | none | 0 to 255 | 1 | 1 | 47 |
| Previous #1 Ephemeris CRC | calculated | N/A | N/A | 2 | 48–49 (LSB ... MSB) |
| Satellite X Position (previous #1 IODE) | meters | ±67,108,864 see note #3 | $1 + 2^8$ | 5 | 50–54 (LSB ... MSB) {5 lsb zero padded} |
| Satellite Y Position (previous #1 IODE) | meters | ±67,108,864 see note #3 | $1 + 2^8$ | 5 | 55–59 (LSB ... MSB) {5 lsb zero padded} |
| Satellite Z Position (previous #1 IODE) | meters | ±67,108,864 see note #3 | $1 + 2^8$ | 5 | 60–64 (LSB ... MSB) {5 lsb zero padded} |
| Satellite Correction (previous #1 IODE) | meters | ±2,097,152 see note #3 | $1 + 2^{10}$ | 4 | 65–68 (LSB ... MSB) |
| Previous #2 IODE | none | 0 to 255 | 1 | 1 | 69 |
| Previous #2 Ephemeris CRC | calculated | N/A | N/A | 2 | 70–71 (LSB ... MSB) |
| Satellite X Position (previous #2 IODE) | meters | ±67,108,864 see note #3 | $1 + 2^8$ | 5 | 72–76 (LSB ... MSB) {5 lsb zero padded} |
| Satellite Y Position (previous #2 IODE) | meters | ±67,108,864 see note #3 | $1 + 2^8$ | 5 | 77–81 (LSB ... MSB) {5 lsb zero padded} |
| Satellite Z Position (previous #2 IODE) | meters | ±67,108,864 see note #3 | $1 + 2^8$ | 5 | 82–86 (LSB ... MSB) {5 lsb zero padded} |
| Satellite Correction (previous #2 IODE) | meters | ±2,097,152 see note #3 | $1 + 2^{10}$ | 4 | 87–90 (LSB ... MSB) |
| SQM data: 0.025 chip early in-phase | height of an ideal correlation peak | ±0.125 see note #3 | $1 + 2^{14}$ | 1.5 | 91–92 lsb = byte 88, bit 0 msb = byte 89, bit 3 |
| SQM data: 0.025 chip late in-phase | height of an ideal correlation peak | ±0.125 see note #3 | $1 + 2^{14}$ | 1.5 | 92–93 lsb = byte 89, bit 4 msb = byte 90, bit 7 |
| SQM data: | height of an ideal | ±0.125 | $1 + 2^{14}$ | 1.5 | 94–95 |

TABLE 2-continued

Structure of the Receiver Status
Message Application Data (Type 49)

| Parameter | Units or Fixed Value | Range | Resolution | Number of Bytes | Byte Number |
|---|---|---|---|---|---|
| 0.050 chip late in-phase | correlation peak | see note #3 | | | lsb = byte 91, bit 0<br>msb = byte 92, bit 3 |
| SQM data:<br>0.075 chip late in-phase | height of an ideal correlation peak | ±0.125<br>see note #3 | $1 + 2^{14}$ | 1.5 | 95–96<br>lsb = byte 92, bit 4<br>msb = byte 93, bit 7 |
| SQM data:<br>0.100 chip late in-phase | height of an ideal correlation peak | ±0.125<br>see note #3 | $1 + 2^{14}$ | 1.5 | 97–98<br>lsb = byte 94, bit 0<br>msb = byte 95, bit 3 |
| SQM data:<br>0.125 chip late in-phase | height of an ideal correlation peak | ±0.125<br>see note #3 | $1 + 2^{14}$ | 1.5 | 98–99<br>lsb = byte 95, bit 4<br>msb = byte 96, bit 7 |
| PLL Discriminator sigma | degrees | 0–63.75 | $1 + 22$ | 1 | 100 |
| CRC-16 (bytes 1 thru 100) | Calculated at Tx. | N/A | N/A | 2 | 101–102 (LSB . . . MSB) |

TABLE 3

Structure of the Receiver Status
Message Application Data (Type 49)

| Parameter | Units or Fixed Value | Range | Resolution | Number of Bytes | Byte Number |
|---|---|---|---|---|---|
| Synchronization Character 1 | 2A hex | N/A | N/A | 1 | 1 |
| Synchronization Character 2 | 2A hex | N/A | N/A | 1 | 2 |
| Number of Bytes (fixed length; includes bytes 4 through 92) | 89 decimal | N/A | N/A | 1 | 3 |
| Reference Receiver | 16 hex | N/A | N/A | 1 | 4 |
| GNS Receiver Mode | (ref. LGR-28494) | N/A | N/A | | 5 {bits 0, 1, 2} |
| Receiver Initialization Message Validated | (ref. LGR-28495) | N/A | N/A | | 5 {bit 3} |
| Time Integrity Monitor Status | (ref. LGR-35063) | N/A | N/A | | 5 {bits 4, 5} {2 msb zero padded} |
| Almanac/Ephemeris Comparison Threshold | meters | 0 to $2^{16} - 1$ | 1 | 2 | 6–7 |
| Ephemeris Consistency Threshold | meters | 0 to $2^{16} - 1$ | 1 | 2 | 8–9 |
| Number of Satellite Measurements | (ref. LGR-28496) | 0 to 255 [valid = 0 to 18] | 1 | 1 | 10 |
| Satellite Visible & Healthy | (ref. LGR-28497) | 0 to 255 | 1 | 1 | 11 |
| S/W Part Number | (ref. LGR-28498) | N/A | N/A | 4 | 12–25 (LSB . . . MSB) |
| Compatibility Number | (ref. LGR-28499) | N/A | N/A | 7 | 26–32 (LSB . . . MSB) |
| Spare | reserved | N/A | N/A | 7 | 33–39 |
| GPS Week Number | weeks | 0 to $2^{16} - 1$ (valid = 0 to 5218) | 1 | 2 | 40–41 (LSB .. MSB) |
| GPS Measurement Time | seconds | 0 to $2^{31} - 1$ (valid = 0 to 604799.5) | $1 + 2$ | 4 | 42–45 (LSB . . . MSB) |
| Receiver Latitude | degrees | ±90 deg (+ = North) | 8.38E-8 deg $(180/2^{31})$ | 4 | 46–49 (LSB . . . MSB) {max data range ±90} |
| Receiver Longitude | degrees | ±180 deg (+ = East) see note #3 | 8.38E-8 deg $(180/2^{31})$ | 4 | 50–53 (LSB . . . MSB) |
| Receiver Attitude | feet | $+2^{17}$ | $1 + 2^3$ | 3 | 54–56 |

TABLE 3-continued

Structure of the Receiver Status Message Application Data (Type 49)

| Parameter | Units or Fixed Value | Range | Resolution | Number of Bytes | Byte Number |
|---|---|---|---|---|---|
| (with respect to msl) | | (+ = up) see note #3 | | | (LSB ... MSB) {3 lsb zero padded} |
| GDOP | unitless | 0–25.5 | 0.1 | 1 | 57 |
| Almanac Space Vehicle Identification (SVID) | n/a | 0–63 (VALID RANGE = 0–32) | N/A PADDED} | 1 | 58 {2 MSB ZERO |
| Eccentricity ($e$) | dimensionless | 0–(1 + $2^5$) | $1 + 2^{21}$ | 2 | 59–60 |
| Time of Applicability ($t_{oa}$) | seconds | 0–$2^{20}$ (VALID RANGE = 0–602,112) | $2^{12}$ | 1 | 61 |
| Orbital Inclination ($\delta_i$) | semi-circles | ±(1 + $2^4$) SEE NOTE #3 | $1 + 2^{19}$ | 2 | 62–63 |
| Rate of Right Ascension (OMEGADOT) | semi-circles/sec | ±(1 + $2^{23}$) see note #3 | $1 + 2^{38}$ | 2 | 64–65 |
| Space Vehicle Health Status Discretes (SV Health) | n/a | N/A | N/A | 1 | 66 |
| Square Root of the Semi-Major Axis ($\sqrt{A}$) | meters$^{1/2}$ | 0–$2^{13}$ | $1 + 2^{11}$ | 3 | 67–69 |
| Longitude of Ascending Node of Orbit Plane at Weekly Epoch ($\Omega_0$) | semi-circles | ±1 see note #3 | $1 + 2^{23}$ | 3 | 70–72 |
| Argument of Perigee ($\omega$) | semi-circles | $1 + 2^{23}$ see note #3 | 3 | 73–75 | |
| Mean Anomaly at Reference Time ($M_0$) | semi-circles | ±1 see note #3 | $1 + 2^{23}$ | 3 | 76–78 |
| Satellite Clock Correction Bias ($a_{f0}$) | seconds | ±(1 + $2^{10}$) see note #3 | $1 + 2^{20}$ | 2 | 79–80 {5 msb zero padded} |
| Satellite Clock Correction Rate ($a_{f1}$) | sec/sec | ±(1 + $2^{28}$) see note #3 | $1 + 2^{38}$ | 2 | 81–82 {5 msb zero padded} |
| Almanac Week Number (WNa) | weeks | 0–255 | 1 | 1 | 83 |
| Spare | reserved | N/A | N/A | 7 | 84–90 |
| CRC-16 (bytes 1 thru 90) | Calculated at Tx | N/A | N/A | 2 | 91–92 (LSB ... MSB) |

Table Notes:
1. Where multiple bytes are required for a parameter, "LSB ... MSB" means least-significant byte to most-significant byte.
2. The terminology "X lsb zero padded" means the X least significant bits are padded with zeros and "X msb zero padded" means the X most significant bits are padded with zeros. No data is contained in the pad bits -- they must be shifted out prior to applying lsb weighting.
3. The actual maximum value is the positive range value minus the least significant bit weight (lsb). The lsb weight is the resolution.

The newly defined Integrity Monitor Message may utilize the LAAS Message Type 50 (which is currently undefined in DO-246A) to communicate the status of integrity monitor checks executed by the GBAS system. These data may include elements illustrated in Table 4.

| BYTES | RANGING SOURCES |
|---|---|
| 1 | Signal Deformormation-Evil Waveform |
| 2 | Signal Deformormation-Cross Correlation |
| 3 | Signal Deformation-Multipath |
| 4 | RFI |
| 5 | Signal to Noise Level |
| 6 | Signal to Noise Cross Correlation |
| 7 | Code Carrier |
| 8 | Acceleration Corrections |
| 9 | Pseudorange Spikes |
| 10 | Filter Spike Restart |
| 11 | Filter Restart |
| 12 | Not Converged at Mask Angle |
| 13 | Excessive PRC |
| 14 | Excessive RRC |
| 15 | Excessive Sigma$_{pr\ gnd}$ |
| 16 | Excessive B-Values |
| 17 | RRC Exclusion |
| 18 | RRC Anomaly |
| 19 | PRC Exclusion |
| 20 | PRC Anomaly |
| 21 | PRC Failure IMON Warning |
| 22 | PRC Failure IMON Fail |
| 23 | PRC Anomaly IMON Warning |
| 24 | PRC Anomaly IMON Fail |
| 25 | Sigma PRC Warn |
| 26 | Sigma PRC Fail |
| 27 | Sigma PRR Warn |

-continued

| BYTES | RANGING SOURCES |
|---|---|
| 28 | Sigma PRR Fail |
| 29 | |
| 30 | Accumulated Delta Range Failure |
| 31 | Position Data Stale Failure |
| 32 | Position Data Stale Warning |
| 33 | Navigation Warning |
| 34 | Navigation Failure |
| 35 | Time Integrity Failure |
| 36 | Minimum Common Failure |
| 37 | Minimum Common Warning |
| 37 | RR Mode Change |
| 38 | Absent Satellite |
| 39 | Less than 4 Satellites 1 RR |
| 40 | Less than 4 Satellites all RR |
| 41 | Type 1 Message Failure Navigation Data |
| 42 | Invalid Parity |
| 43 | Bad IODC |
| 44 | HOW Bit 18 |
| 45 | NAV is 0 |
| 46 | Bad Preamble |
| 47 | Ephm CRC change, not IODE |
| 48 | Sat Unhealthy |
| 49 | Ephem Alm Miscompare |
| 50 | Ephem Alm Miscompare |
| 51 | Ephem Ephem Miscompare |
| 52 | Ephem Ephem Miscompare |
| 53 | Inconsistent NAV Data Sets |
| 54 | Ephemeris Transition Failure |
| 55 | Ephemeris Transition Failure |
| 56–59 | Time of applicability |
| 60–61 | 16 bit CRC |

Each byte is composed of the following:

| Bit Definition | | | | | | | |
|---|---|---|---|---|---|---|---|
| 0 | 1 | 2 | 3 | 4 | 5 | 6 | 7 |
| Fault | Recovery | Alert | | Don't Care | | | |

0 = Not present
1 = Present

Figure 5:
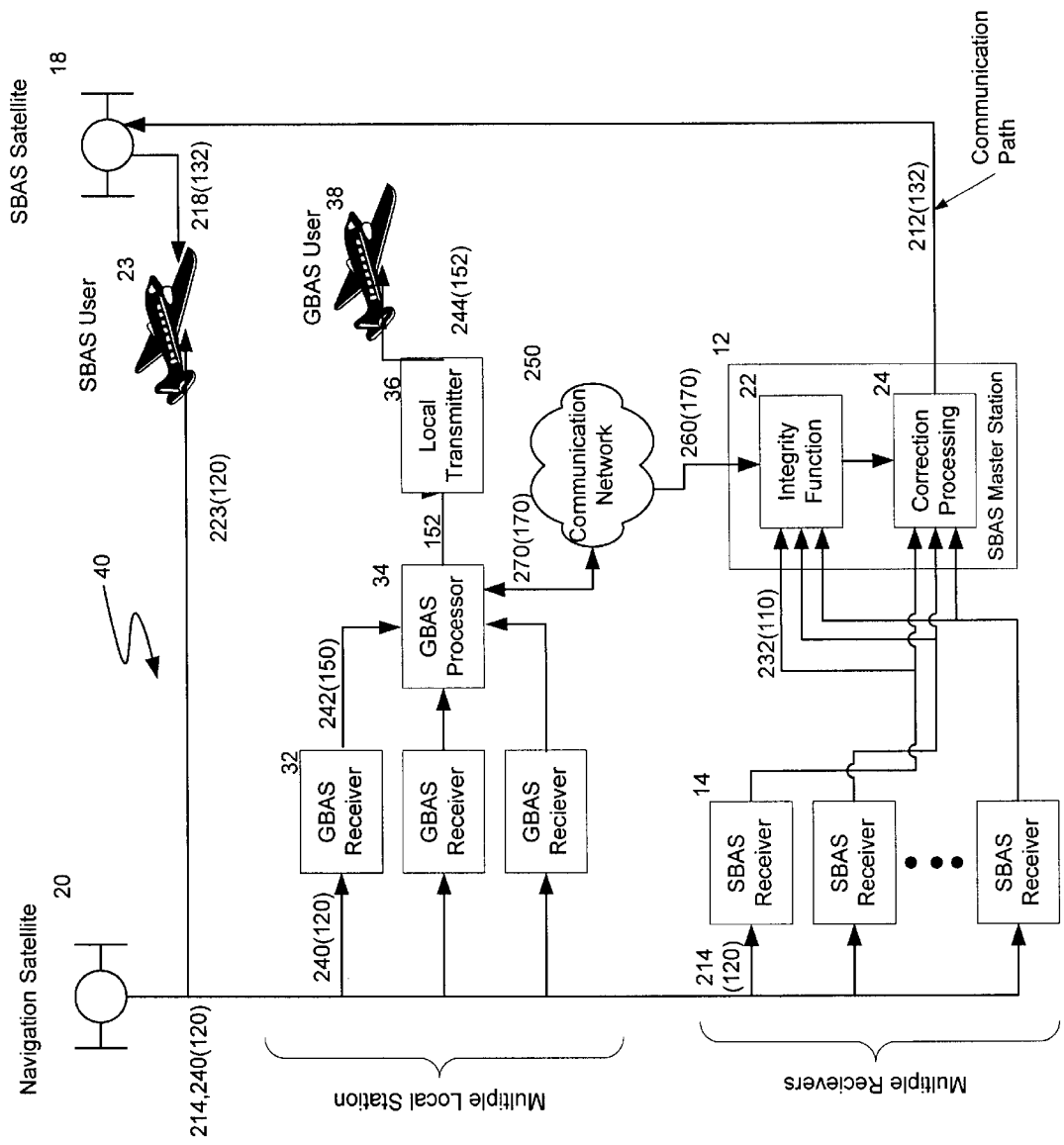
FIG. 5 is a dataflow schematic illustrating the inventive hybrid system.

A more detailed description of the integrated system can be seen in FIG. 5. As can be seen in the integration, the GBAS processor 34 transmits the formatted integrated system data 170 in the form of LAAS formatted message types to the SBAS master station 12 over the interconnecting system communication network 250. This information is then processed by the SBAS correction processing 24 and the SBAS correction and integrity data 132 is transmitted to the SBAS satellite 18 over an SBAS master station to SBAS satellite communication path 212.

GBAS Structure and Function

Figure 6:
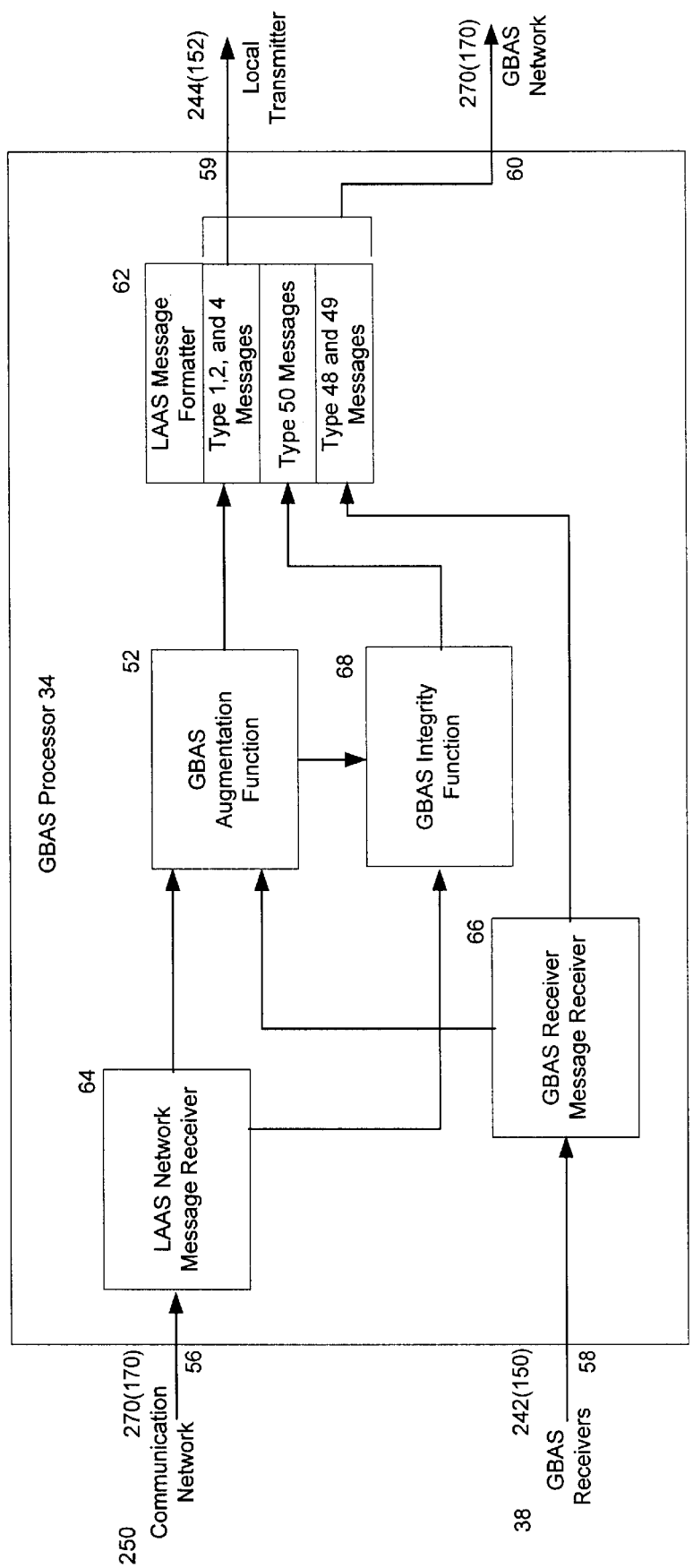
FIG. 6 is a dataflow schematic showing a preferred embodiment for the inventive GBAS processor.

FIG. 6 illustrates the inventive GBAS structure in which the GBAS processor 34 has a network input 56 from the communication network 250 for receiving formatted integrated system data 170, such as the LAAS formatted message types described above, over a communication path 270. The network input 56 provides the data 170 to an LAAS message receiver 64 that translates received message data and stores it in an augmentation data database 52. The LAAS message receiver 64.

The processor 34 also has a receiver input 58 for receiving raw augmentation data 150 from the GBAS receiver 32 over a communication path 242. The GBAS receiver message receiver 66 translates received data 150 and sends data for each receiver to the GBAS augmentation function 52. The GBAS receiver message receiver 66 may contain hardware elements and/or software elements for performing this translation and storage operation. This message receiver function produces the LAAS Type 48 and Type 49 information and sends that information to the LAAS Message formatter 62 for creation of these messages.

In a preferred embodiment, the LAAS message formatter 62 utilizes the GBAS Augmentation function 52 data, the GBAS Integrity Function 68 data and GBAS Receiver Message Receiver to format LAAS Type 1, 2, 4, 48, 49 and 50 messages. The LAAS Message Formatter 62 then can output these formatted messages 170 to the communication network 250 using a processor network output 60 and a communication path 244. The LAAS message formatter 62 can output the formatted GBAS data 152 to a user 38 using a user output 59 to a local area transmitter 36 and a communication path 244 to the user 38.

The inventive GBAS has two primary functions: (1) output the messages consistent with the above-described LAAS protocol, and (2) utilize the received inputs to enhance the current computations.

Generation of the actual LAAS formatted Type 1, 2 and 4 messages for the LAAS signal in space is well known and defined in the link protocol according to DO-256A and DO-245. The additional Type 48 and Type 49 messages are generated from the raw augmentation (observable and configuration) data 150 determined at each receiver 32 in the GBAS. The Type 50 message contains the result of integrity monitors 68 executed on the ranging source signals 120 received by the GBAS system from the Navigation Satellite 20.

Each GBAS 30 on the network also receives the same set of messages (Types 1, 2, 4 and 48–50) from each of the other GBASs 30 on the network. This information is used for: (1) long base-line monitoring, and (2) development of corrections with integrity over a wide area.

Performance at the mobile receiver decreases as the distance (or baseline) between the GBAS and the mobile receiver increases. To protect the integrity of the mobile user, the GBAS monitors phenomena that vary over long distances. These phenomena include ionospheric effects, RFI interference, and Navigation Satellite ephemeris errors. GBAS receivers are placed in close proximity to each other. This proximity makes the effects of these long baseline phenomena difficult to observe and monitor since the observable effects over the short distance of separation are small. By using the receiver measurement data from other GBASs via the communication network (utilizing the Type 48 and 49 messages) the baseline is extended to the distance between GBAS systems and thereby the effects of the long baseline phenomena are more observable and can be monitored in a simpler and more robust manner.

The long baseline created by the use of data from other GBAS stations allows the GBAS to produce corrections with integrity over a wide area. The GBAS station would create these corrections from the Type 1 and 2 messages received. The resulting corrections can be transmitted on the GBAS local transmitter. The collection of GBAS systems interconnected over a large area would produce a similar function to the SBAS but without the satellite link.

SBAS Structure and Function

Figure 7:
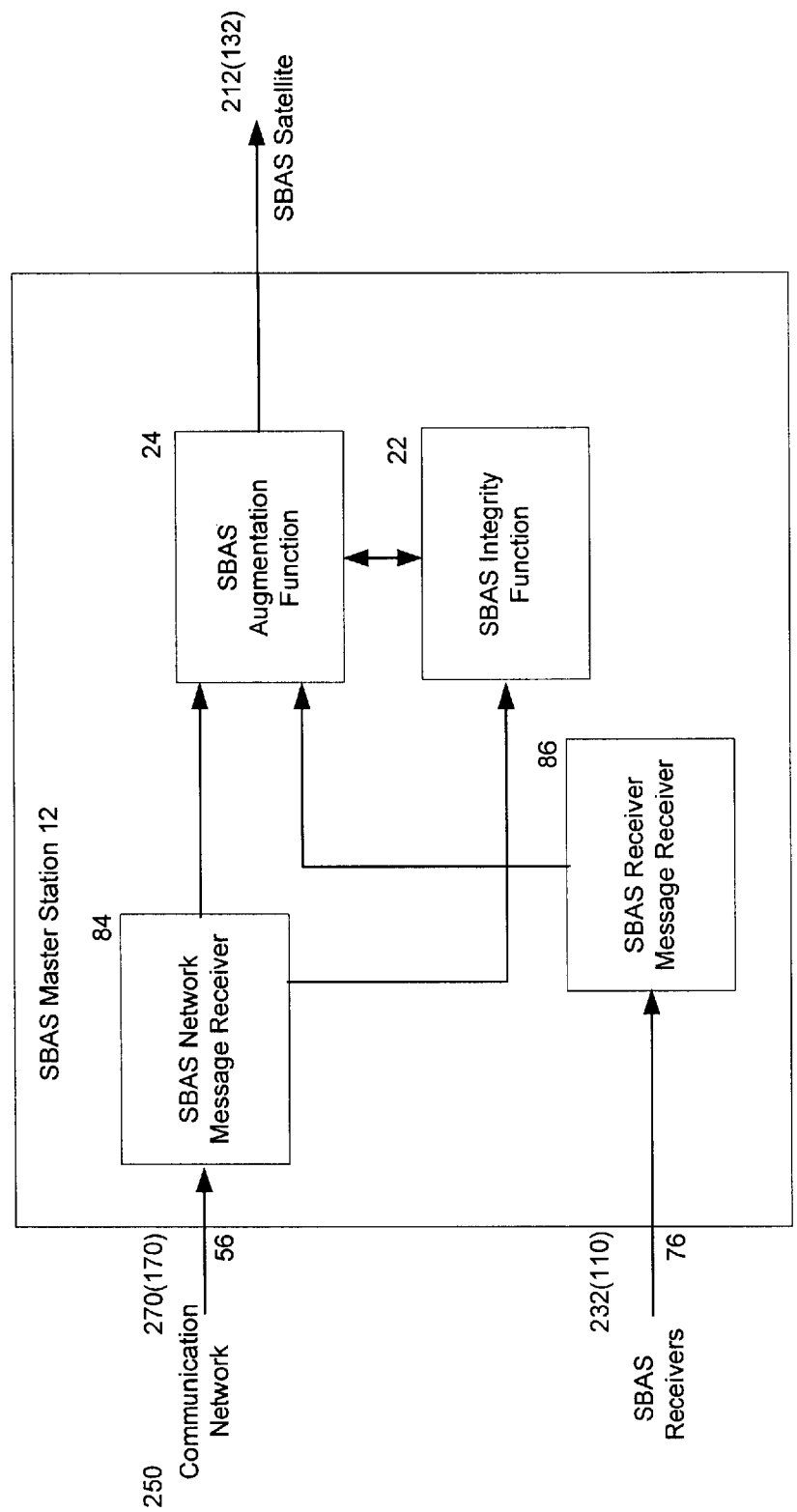
FIG. 7 is a dataflow schematic showing a preferred embodiment for the inventive SBAS processor.

FIG. 7 illustrates the inventive SBAS structure. The SBAS 10 receives the LAAS Messages (Type 1, 2 48, 49 and 50) from GBAS systems 30 on the communication network 270 with an SBAS network message receiver 84. The messages received are decoded and the data is passed to the SBAS Augmentation function 24 and SBAS Integrity Function 22. The SBAS Augmentation function combines the data from the network along with the data from the SBAS receivers 110 received via an SBAS receiver communication input 232 to create corrections with a higher accuracy than the original SBAS system. The accuracy of the SBAS is dependent on the number and geographical dispersion of the measurements. Using the data from the GBAS systems received on the network increases both of these factors.

The SBAS integrity Monitor Function 22 may also use the measurement (Type 48, Type 49) and/or the correction data (Type 1, Type 2) as a mechanism to monitor the integrity of the corrections produced by the SBAS augmentation Function 24 from measurements made by the SBAS Receivers. Using the inventive GBAS Network data 170 to supplement the SBAS integrity has a distinct advantage. When there are GBAS geographically dispersed around the SBAS receivers, an additional and dissimilar collection of measurements is provided to the SBAS integrity function without the addition of more SBAS receivers. With this additional system of measurements corrections can be constructed (Using the Type 48 and 49 messages or Type 1 and 2 message) over the wide are of SABS coverage and then compared to the corrections generated by the SBAS Augmentation Function 22. Additionally, the GBAS systems have a higher level of integrity than a SBAS system because the GBAS is used for precision approach applications where the requirements are stricter. The inventive SBAS, using the GBAS measurements with greater integrity realize the benefit of increasing the integrity of the SBAS corrections 132 since the data used to check the integrity is of higher integrity than was possible with SBAS alone.

The preferred embodiments illustrated in the drawings, and specific language above are illustrative of the purposes of the invention. No limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit or optical components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/ or control, data processing and the like.

The particular implementations shown and described are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical system. Moreover, no item or component is essential to the practice of the invention unless the element is specifically described as "essential" or "critical". Numerous modifications and adaptations will be readily apparent to those skilled in this art without departing from the spirit and scope of the present invention.

LIST OF REFERENCE CHARS

| 1–99 Physical Hardware, databases, function blocks | |
|---|---|
| 10 | SBAS (satellite-based augmentation system) |
| 12 | SBAS master station |
| 14 | SBAS receivers |
| 16 | SBAS area of coverage |
| 18 | SBAS satellite |
| 20 | navigational satellite |
| 22 | SBAS master station integrity monitor processor |
| 23 | SBAS user |
| 24 | SBAS master station correction processor |
| 30 | GBAS (ground-based augmentation system) |
| 32 | GBAS receiver |
| 33 | GBAS transmission to GBAS processor |
| 34 | GBAS processor |
| 36 | GBAS local area transmitter |
| 37 | GBAS transmission to GBAS user |
| 38 | GBAS user |
| 40 | integrated SBAS/GBAS |
| 52 | GBAS augmentation data database |
| 54 | GBAS receiver status data database |
| 56 | GBAS processor network input |
| 58 | GBAS processor receiver input |
| 59 | GBAS processor transmitter/user output |
| 60 | GBAS processor network output |
| 62 | GBAS LAAS message formatter |
| 64 | GBAS LAAS message receiver |
| 66 | GBAS receiver augmentation data receiver |
| 68 | GBAS integrity monitor check |
| 72 | SBAS augmentation data database |
| 74 | SBAS master station network input |
| 76 | SBAS master station receiver input |
| 78 | SBAS master station output |
| 84 | SBAS LAAS message receiver |
| 86 | SBAS receiver augmentation data receiver |
| 100–199 Data/Protocol | |
| 110 | SBAS augmentation data (differential corrections, ionospheric delay errors, accuracy of navigation satellite signals, etc.) |
| 112 | Processed augmentation data |
| 120 | Navigation satellite data, including measurement data |
| 132 | SBAS correction & integrity data |
| 150 | GBAS raw augmentation data |
| 152 | Formatted GBAS differential correction and integrity data; LAAS formatted messages to the user |
| 170 | Formatted integrated system data; LAAS formatted messages, types 1, 2, 4 & 48–50 to the integrated communication network |
| 200–299 Communication paths/network | |
| 200 | Integration apparatus communication network |
| 212 | SBAS master station to SBAS satellite communication path |
| 214 | Navigation satellite to SBAS receiver communication path |
| 218 | SBAS satellite to SBAS user communication path |
| 223 | Navigation satellite to SBAS user communication path |
| 232 | SBAS receiver to SBAS master station communication path |
| 234 | SBAS receiver to SBAS receiver relay communication path |

-continued

| | |
|---|---|
| 240 | Navigation satellite to GBAS receiver communications path |
| 242 | GBAS receiver to GBAS processor communications path |
| 244 | GBAS local transmitter to GBAS user communication path |
| 250 | Interconnecting system communication network |
| 260 | SBAS to interconnecting system communication network communication path |
| 270 | GBAS to interconnecting system communication network communication path |

What is claimed is:

1. A ground based augmentation system (GBAS) network, comprising:
a navigation satellite;
an interconnecting system communication network;
at least a first GBAS and a second GBAS, each GBAS comprising:
a GBAS receiver that is configured to receive navigation satellite data from the navigation satellite and covert it into GBAS raw augmentation data;
a GBAS processor that is configured to receive GBAS raw augmentation data from the GBAS receiver and to format it into formatted GBAS differential correction and integrity data; and
a GBAS transmitter configured to send GBAS differential correction and integrity data to the interconnecting system communication network;
the GBAS processor of the first GBAS being configured to receive GBAS differential correction and integrity data produced by the second GBAS and to include this data in its own formatted GBAS differential correction and integrity data.

2. An integrated satellite based augmentation system (SBAS)-GBAS comprising:
a navigation satellite;
an interconnecting system communication network;
one or more GBASs, each GBAS comprising:
a GBAS receiver that is configured to receive navigation satellite data from the navigation satellite and covert it into GBAS raw augmentation data;
a GBAS processor that is configured to receive GBAS raw augmentation data from the receiver and to format it into formatted GBAS differential correction and integrity data; and
a GBAS transmitter configured to send GBAS differential correction and integrity data to the interconnecting system communication network;
the integrated SBAS-GBAS system further comprising:
an SBAS, comprising:
an SBAS satellite that is configured to transmit SBAS correction and integrity data to a user;
an SBAS receiver that is configured to receive navigation satellite data from the navigation satellite and convert it into SBAS augmentation data;
an SBAS master station that is configured to receive the SBAS augmentation data from the receiver, to receive GBAS differential correction and integrity data from the interconnecting system communication network, and to transmit processed SBAS correction and integrity data that includes the received GBAS differential correction and integrity data to the SBAS satellite.

3. The integrated SBAS-GBAS system according to claim 2, wherein the transmitter is further configured to send GBAS differential correction and integrity data to a GBAS user.

4. An integrated SBAS-GBAS system comprising:
a navigation satellite;
an interconnecting system communication network;
one or more GBASs, each GBAS comprising:
a receiver that is configured to receive navigation satellite data from the navigation satellite over a navigation satellite to GBAS receiver communication path and convert the navigation satellite data into GBAS raw augmentation data;
a processor that is configured to receive GBAS raw augmentation data over a receiver to processor communication path, the processor comprising:
a network input connected to a GBAS to interconnecting system communication network communication path that is configured to receive formatted integrated system data from the communication network;
a receiver input connected to a GBAS receiver to GBAS processor communications path that is configured to receive the raw augmentation data from the receiver;
an augmentation data database;
a Local Area Augmentation System (LAAS) message receiver that is configured to receive the formatted integrated system data from the network input, convert the integrated system data, and store it in the augmentation data database;
a GBAS receiver augmentation data receiver that is configured to receive the raw augmentation data from the receiver input, convert the raw augmentation data, and store it in the augmentation data database;
an integrity monitor checker that is configured to read data from the augmentation data database;
a receiver status database that is configured to store receiver status data;
an LAAS message formatter that is configured to accept information from at least one of the augmentation data database, the integrity monitor checker and the GBAS receiver status database, and is configured to create at least one of LAAS messages for output;
a network output that is configured to accept LAAS messages from the LAAS message formatter and output them to the GBAS to interconnecting system communication network communication path;
a transmitter/user output that is configured to accept LAAS messages from the LAAS message formatter and output them to at least one of a local transmitter and user;
the integrated SBAS-GBAS system further comprising:
an SBAS, comprising:
an SBAS satellite that transmits SBAS correction and integrity data to a user over an SBAS satellite to SBAS user communication path;
a receiver that is configured to receive navigation satellite data from the navigation satellite over a navigation satellite to SBAS receiver communication path and convert the navigation satellite data into SBAS augmentation data;
a master station that is configured to receive the SBAS augmentation data from the receiver over an SBAS receiver to SBAS master station communication path, the master station further comprising:
a network input connected to an SBAS to interconnecting system communication network communication path that is configured to receive formatted integrated system data from the communication network;

a receiver input connected to an SBAS receiver to SBAS master station communications path that is configured to receive SBAS augmentation data from the receiver;

an augmentation data database;

an SBAS LAAS message receiver that is configured to receive the formatted integrated system data from the network input, convert the integrated system data, and store it in the augmentation data database;

an SBAS receiver augmentation data receiver that is configured to receive the SBAS augmentation data from the receiver input, convert the SBAS augmentation data, and store it in the augmentation data database;

an SBAS integrity processor that is configured to receive the SBAS augmentation data that is stored in the augmentation data database and configured to process integrity data;

a correction processor that is configured to receive augmentation data from the augmentation database and the integrity data and produce SBAS correction and integrity data;

an output that is configured to accept the SBAS correction and integrity data from the correction processor and output them to the SBAS satellite via the SBAS master station to SBAS satellite communication path.

5. A method for operating a networked GBAS system, comprising:

receiving navigation satellite data by a first GBAS;

formatting navigation satellite data by the first GBAS into formatted GBAS differential correction and integrity data;

transmitting the formatted GBAS differential correction and integrity data to an interconnecting system communication network;

receiving the formatted GBAS differential correction and integrity data from the interconnecting system communication network by a second GBAS;

formatting navigation satellite data by the second GBAS into further formatted GBAS differential correction and integrity data, utilizing the received formatted GBAS differential correction and integrity data from the first GBAS; and transmitting the further formatted GBAS differential correction and integrity data to at least one of the interconnecting system communication network and a GBAS user.

6. The method according to claim 5, further comprising:

calculating improved inherent accuracy data by the second GBAS processor utilizing measurement data provided by the first GBAS.

7. The method according to claim 5, further comprising:

calculating improved integrity data by the second GBAS processor utilizing integrity data provided by the first GBAS.

8. The method according to claim 5, further comprising:

calculating at least one of measurement and integrity parameters that vary over a long baseline by the second GBAS processor utilizing data provided by the first GBAS.

9. A method for transmitting SBAS correction and integrity data to an SBAS satellite, comprising:

producing, by a GBAS processor, formatted integrated system data comprising GBAS raw augmentation data;

receiving, by an SBAS master station, SBAS augmentation data from an SBAS receiver and the formatted integrated system correction and integrity data from a communication network;

formatting, by the SBAS master station, SBAS correction and integrity data using the SBAS augmentation data and the GBAS differential correction and integrity data; and transmitting the SBAS correction and integrity data to an SBAS satellite by the SBAS master station.

10. A method for operating an integrated SBAS-GBAS system that comprises a GBAS and an SBAS, the method comprising:

receiving navigation satellite data by a GBAS receiver and an SBAS receiver;

formatting GBAS raw augmentation data from the navigation satellite data by the GBAS receiver;

transmitting, by the GBAS receiver, GBAS raw augmentation data to a GBAS processor;

formatting GBAS raw augmentation data into formatted GBAS differential correction and integrity data by the GBAS processor;

transmitting the formatted GBAS differential correction and integrity data to an interconnecting system communication network;

formatting SBAS augmentation data from the navigation satellite data by the SBAS receiver;

transmitting, by the SBAS receiver, SBAS augmentation data to an SBAS master station;

receiving, by the SBAS master station, formatted GBAS differential correction and integrity data from the interconnecting system communication network;

formatting, by the SBAS master station, SBAS correction and integrity data using the SBAS augmentation data and the GBAS differential correction and integrity data; and transmitting the SBAS correction and integrity data to an SBAS satellite by the SBAS master station.

11. The method according to claim 10, further comprising:

transmitting, by the formatted GBAS differential correction and integrity data to a GBAS user.

12. The method according to claim 10, further comprising:

calculating differential correction parameters by the SBAS master station utilizing differential correction parameters provided by the GBAS.

13. The method according to claim 10, further comprising:

calculating integrity to corrections by the SBAS master station utilizing integrity data provided by the GBAS.

14. The method according to claim 10, further comprising:

calculating at least one of measurement and integrity parameters that vary over a long baseline by the SBAS master station utilizing data provided by the GBAS.

15. A method for operating an integrated satellite navigation system comprising a high precision narrow area component and a low precision wide area component, the method comprising:

receiving satellite navigation data transmitted by a navigation satellite by the high precision component and the low precision component;

formatting, by the high precision component, the navigation satellite data into high precision augmentation data;

formatting, by the low precision component, the navigation satellite data into low precision navigation data;

combining, by at least one of the high precision component and low precision component, the high precision augmentation data and the low precision navigation data; and retransmitting, by at least one of the high precision component and low precision component, the combined data.

16. An integrated satellite based augmentation system comprising:

a navigation satellite;

a high precision narrow area component comprising a receiver that is configured to receive navigation satellite data from the navigation satellite, the high precision component being configured to convert the navigation satellite data into high precision augmentation data;

a low precision wide area component comprising a receiver that is configured to receive navigation satellite data from the navigation satellite, the low precision component being configured to convert the navigation satellite data into low precision navigation data; and a transmitter comprising an input to receive the high precision augmentation data and an input to receive the low precision navigation data, and a processor that combines the high precision augmentation data and the low precision navigation data, the transmitter being configured for retransmitting the combined data.

* * * * *

UNITED STATES PATENT AND TRADEMARK OFFICE
CERTIFICATE OF CORRECTION

PATENT NO. : 6,826,476 B2
DATED : November 30, 2004
INVENTOR(S) : Mark A. Ahlbrecht et al.

It is certified that error appears in the above-identified patent and that said Letters Patent is hereby corrected as shown below:

Column 1,
Line 44, change "cause a an undetected" to -- cause an undetected --.

Column 3,
Line 8, change "of the of the SBAS" to -- of the SBAS --.
Line 34, change "can improved" to -- can be improved --.

Column 6,
Line 62, change "between the a ranging" to -- between a ranging --.

Columns 8-11,
Table 2, change all instances of "1 +" to -- 1 ÷ --.

Columns 9-10,
Table 2, in the Accumulated Delta Range (Fractional part) line, change "1 + $2^9$" to -- 1 ÷ $2^{19}$ --.

Columns 11-12,
Table 2, change "1 + 22" to -- 1 ÷ $2^2$ --.
Table 3, the "S/W Part Number" line, under the "Number of Bytes" column, change "4" to -- 14 --.

Columns 11-13,
Table 3, change all instances of "1 +" to -- 1 ÷ --.

UNITED STATES PATENT AND TRADEMARK OFFICE
CERTIFICATE OF CORRECTION

PATENT NO. : 6,826,476 B2
DATED : November 30, 2004
INVENTOR(S) : Mark A. Ahlbrecht et al.

It is certified that error appears in the above-identified patent and that said Letters Patent is hereby corrected as shown below:

Columns 13-14,
Table 3, the "Argument of Perigee ($\omega$)" line, under the "Range column, please insert -- $\pm$ 1 --.

Signed and Sealed this

Thirteenth Day of September, 2005

JON W. DUDAS
*Director of the United States Patent and Trademark Office*